United States Patent [19]

Ogle

[11] 3,742,483

[45] June 26, 1973

[54] VIDEO DISPLAY SYSTEM USING DISPLAY PANEL

[75] Inventor: James A. Ogle, Neshanic Station, N.J.

[73] Assignee: Burroughs Corporation, Detroit, Mich.

[22] Filed: June 1, 1971

[21] Appl. No.: 148,382

[52] U.S. Cl.... 340/324 M, 178/7.3 D, 315/169 TV, 340/166 EL

[51] Int. Cl. ........................................ G08b 5/36

[58] Field of Search .................... 340/324 R, 166 R, 340/166 EL, 324 M; 315/169 R, 169 TV; 178/7.3 D; 40/52 R

[56] References Cited

UNITED STATES PATENTS

| | | | |
|---|---|---|---|
| 3,559,190 | 1/1971 | Bitzer et al. | 315/169 R |
| 3,379,831 | 4/1968 | Hashimoto | 340/324 R X |
| 3,526,711 | 9/1970 | Boer | 315/169 R X |
| 3,590,156 | 6/1971 | Easton | 315/169 TV X |
| 3,601,532 | 8/1971 | Bitzer et al. | 178/7.3 D |
| 3,627,924 | 12/1971 | Fleming et al. | 315/169 TV X |

*Primary Examiner*—David L. Trafton
*Attorney* – Kenneth L. Miller, Robert A. Green et al.

[57] ABSTRACT

The system operates with a display panel comprising a large number of small dot-like gas-filled cells, each of which has a drive circuit which can be energized to pass current therethrough to cause the cell to glow. The system includes means for applying both a video signal and a control signal to the driver circuit to thereby control the amplitude and time duration of the current flowing through a cell. This controls the cell brightness. Another system includes (1) a driver circuit to which a varying voltage is applied to cause a varying current to pass therethrough to a cell and (2) a voltage comparator which combines the video signal and a control signal to control the time duration of said varying voltage applied to the driver and thus the time duration of said varying current. This also controls the cell brightness.

17 Claims, 7 Drawing Figures

INVENTOR
James A. Ogle
BY Robert A. Green
ATTORNEY

INVENTOR.
James A. Ogle
BY Robert G. Green
ATTORNEY

Patented June 26, 1973 3,742,483

5 Sheets-Sheet 3

INVENTOR.
James A. Ogle
BY Robert G. Green
ATTORNEY

INVENTOR
James A. Ogle
BY Robert C. Green
ATTORNEY

INVENTOR.
James A. Ogle
BY Robert G. Green
ATTORNEY

VIDEO DISPLAY SYSTEM USING DISPLAY PANEL

BACKGROUND OF THE INVENTION

Display panels comprising a large number of small dot-like gas-filled cells, each of which can be adapted to glow selectively, have been known in the art for some time and they have recently become commercially available. A typical panel of this type is known as a SELF-SCAN panel display. Panels of this type can be readily used to display characters, messages, or the like, by turning on groups of cells and the brightness of any one cell in a group is determined by the current flow therethrough. Thus, cell brightness can be controlled by current amplitude or by modulating the length of a current pulse. However, these methods of controlling brightness are not completely suitable for the type of system described below wherein a plurality of channels of picture information are received and processed simultaneously. In such a system, known methods of controlling brightness and contrast are not suitably responsive to scenes which are changeable and may have a wide range of light levels to be reproduced.

SUMMARY OF THE INVENTION

Briefly, a system embodying the invention includes a display panel comprising a plurality of tiny, gas-filled cells, each of which can be caused to glow selectively. The system includes circuit means for controlling the current flow through each display cell by varying its time duration and amplitude by a unique interaction of video signals and control signals.

DESCRIPTION OF THE PREFERRED EMBODIMENTS

Figure 1:
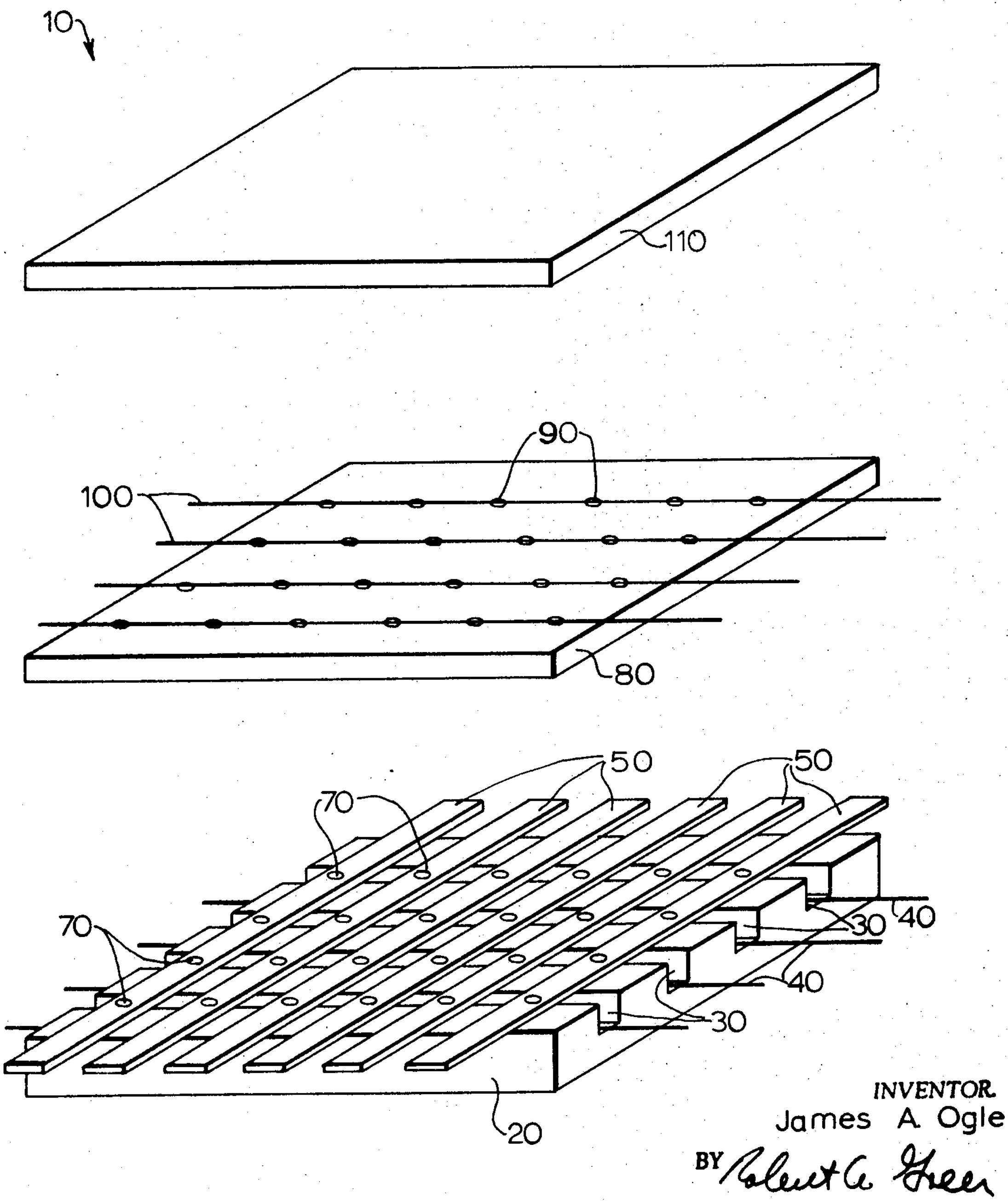
FIG. 1 is an exploded perspective view of a display device used in practicing the invention.

The system of the invention 10 is particularly suited for use with a display panel 14 of the type known as a SELF-SCAN panel. This type of panel includes a bottom plate 20 of insulating material, such as glass or ceramic, having a plurality of parallel slots 30 formed in the top surface thereof. Electrodes 40, which are used as scanning anodes in one mode of operation of the panel, are seated in each of the slots 30, and electrodes 50, used as scanning cathodes, are seated on or in the top surface of plate 20. Each cathode electrode 50 crosses each anode electrode 40, and each crossing defines a scanning cell 60. The cathodes include rows of tiny apertures 70, each of which is located at a scanning cell. The scanning cells are arrayed in rows and columns, and each cathode 50 is oriented along a vertical column of scanning cells in the panel as illustrated.

The panel 10 includes an insulating plate 80 disposed over the cathodes 50 and having apertures or display cells 90 arrayed in rows and columns, with each cell 90 being in operative relation with and positioned over a cathode aperture 70 and a scanning cell 60. Display anode wires 100 are disposed on or in the top surface of the insulating plate 80, and each is aligned with a row of display cells 90. A glass cover plate 110 completes the panel.

The panel is filled with a suitable ionizable gas such as neon, argon, xenon or the like, or mixtures of such gases and a vapor of mercury is usually included to minimize cathode sputtering.

Figure 2:
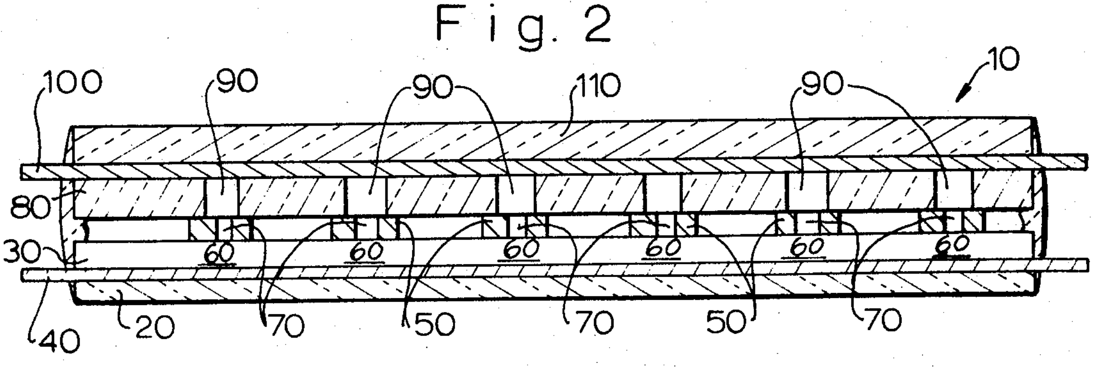
FIG. 2 is a sectional view through the device shown in FIG. 1.

The operation of a SELF-SCAN panel and the structural features thereof are described and claimed in copending application Ser. No. 850,984, filed Aug. 18, 1969. Briefly, the operation comprises applying operating potential to all of the scanning anodes 40 and then applying operating potential sequentially and in turn to each of the scanning cathode electrodes 50, beginning, for example, at the left and proceeding to the right, as seen in FIGS. 1 and 2. As each scanning cathode is energized, the associated column of scanning cells 60 is fired, and this operation is carried out sequentially throughout the panel. Simultaneously, with the energization of each cathode 50, information signals are applied to selected display anodes 100, and the display cells 90, associated with the energized anodes 100 and the energized scanning cells 60, are fired. The information signals on anodes 100 may change in accordance with the message to be entered, with each scanning cathode energized so that, as the panel is continuously scanned and information signals are entered, a stationary but changeable message made up of energized display cells can be viewed through the face plate.

Now considering the system 10, the system includes display panel 14, shown schematically and a source of video signals which, in this embodiment of the invention, are shown as an array of photodiodes 130, with one photodiode being provided for each display anode 100 in panel 14. The photodiodes are arrayed in a vertical column and are adapted to scan the remote object or scene to be displayed in panel 14. In one suitable arrangement, the scanning of the object or scene to be transmitted is achieved by means of an oscillating mirror (not shown) which is arranged so that it receives light from the scene to be reproduced and it simultaneously scans the array of diodes from left to right and right to left continually with the photodiodes producing video signals continuously.

Figure 4:
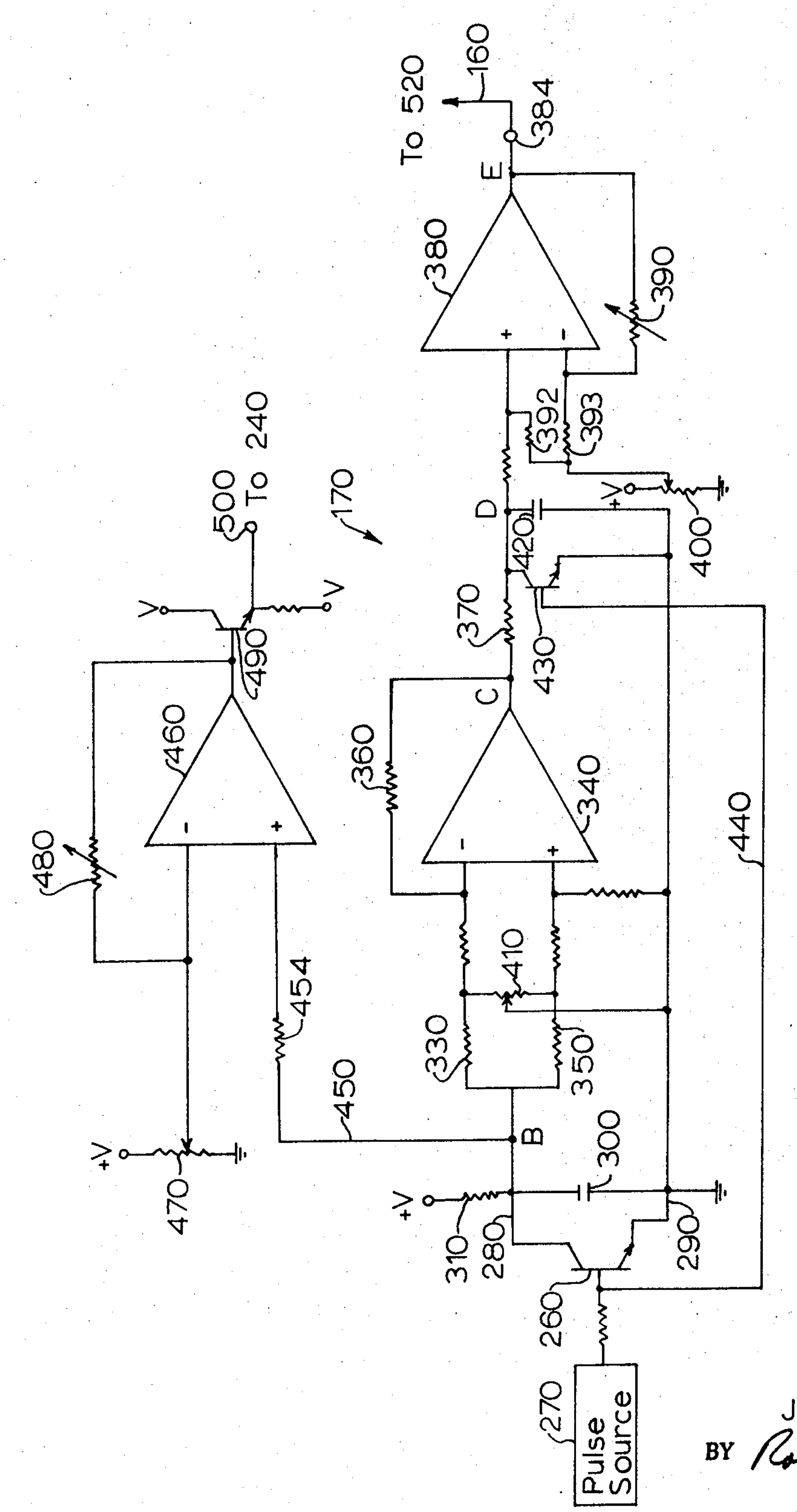
FIG. 4 is a schematic representation of a portion of the circuit of FIG. 3.

Each photodiode 130 is coupled through a lead 140 to one input of a differential amplifier 150 used as a voltage comparator. The other input of each differential amplifier is coupled through a common conductor 160 to a source 170 of a waveform which may take many forms, with a sawtooth wave 180 being suitable for illustrating the invention. The output of each differential amplifier 150 is coupled by a lead 190 to the input of an anode driver 200 which is connected to a display anode 100. The driver 200 preferably is a current source and may comprise a NPN transistor 210 as shown in FIG. 4 having its base connected to lead 190, its emitter connected to a potential source to be described, and its collector connected (1) through a resistor 220 to a source of potential to be described and (2) through a resistor 230 to a display anode 100.

The circuit 170 also produces a generally sawtooth control voltage 236 which is connected by lead 240 and through a resistive path to the anode drivers.

Figure 3:
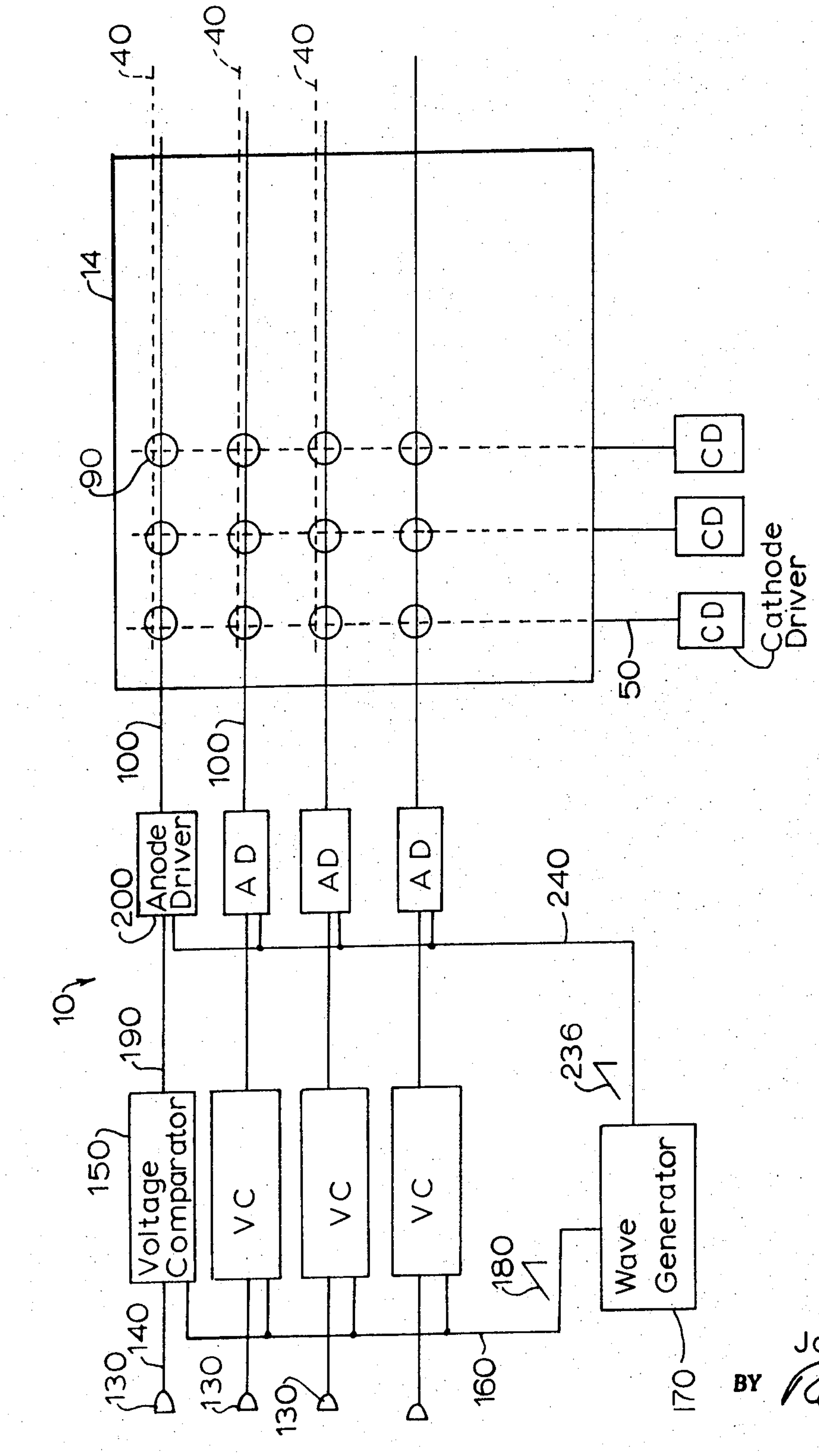
FIG. 3 is a schematic representation of the display device of FIG. 1 and a circuit embodying the invention in which it may be operated.

In operation of the block diagram system shown in FIG. 3, the scanning cells in display panel 14 are scanned column by column as described above. Considering the circuitry coupled to the display panel 14, the control voltage 236 applied to the anode drivers controls the brightness displayed in each display cell in the column of display cells associated with the column of scanning cells which is energized. Thus, if the sawtooth wave 236 is applied to each anode driver 200 for its full length of time, then each cell in a column will glow with maximum brightness. However, the length of time which the wave 236 is permitted to be applied to each driver is determined by the combination of the video signal transmitted by the photodiode 130 to the voltage comparator and the reference voltage 180 from source 120 applied to the comparator. Thus, each video signal reacts with the voltage wave 180 in a voltage comparator and when the two voltages equal each other, the comparator operates to turn off the associated anode driver 200. Thus, if the video signal is at a high level, it will not be equalled by the voltage wave 180 until say the maximum value of that voltage has been reached. Thus, for this entire period of time, increasing current (due to voltage wave 236) flows through an associated anode driver 200 and maximum cell brightness results. If the incoming video signal is of small amplitude, then it might be equalled by the voltage wave 180 very quickly, in which case the associated anode driver 200 would be turned off early in the applied voltage wave 236, in which case little current would flow for a short time and the associated display cell would exhibit a low brightness level.

Thus, depending on the amplitude of the incoming video signal, display cells in a column may not glow at all or they may glow at different levels of brightness up to a maximum brightness. Each column of display cells is thus energized and caused to glow at a certain brightness and if the scanning operation is carried out at a sufficiently high rate, a stationary, but changeable, picture having gray scale or contrast can be displayed in the panel 14.

The circuit 170, shown in detail in FIG. 4, includes a NPN transistor 260 having its base connected to a source 270 of periodic, generally rectangular pulses 280 (FIG. 5) and having its collector connected to a bus 280 and its emitter connected to a reference bus 290. A capacitor 300 is connected between the buses 280 and 290 and a resistor 310 connects bus 280 to a power source. The resistor 310 and capacitor 300 form an integrating network which converts the input pulses 280 to sawtooth waves 320 at point B. Bus 280 is connected through a first resistive path 330 to the negative input of an operational amplifier 340 (known colloquially as an op amp) and through a second resistive path 350 to the positive input of the op amp 340. A potentiometer 410 is connected across the two inputs of the op amp 340.

The negative input of the op amp 340 is connected through a resistive path 360 to the output thereof and the output is connected through a resistive path 370 to the positive input of a second op amp 380. The negative input of the second op amp is connected through a gain control potentiometer 390 to its output. Both inputs of the second op amp 380 are connected through resistive paths 392 and 393 to a potentiometer 400.

The resistive path 370 is also connected by a capacitor 420 to the reference bus 290 to form an integrating network therewith and through a NPN transistor 430 to the reference bus 290. The base of the transistor 430 is connected through lead 440 to the source 270 of input pulses.

The bus 280 is also connected by lead 450 and a resistive path 454 to the positive input of a third op amp 460, the negative input of which is connected to a potentiometer 470 and through a second potentiometer 480 to the emitter of a transistor 490 having its base connected to the output of the third op amp 460. An output terminal 500 is connected to the emitter of the transistor 490.

Figure 5:
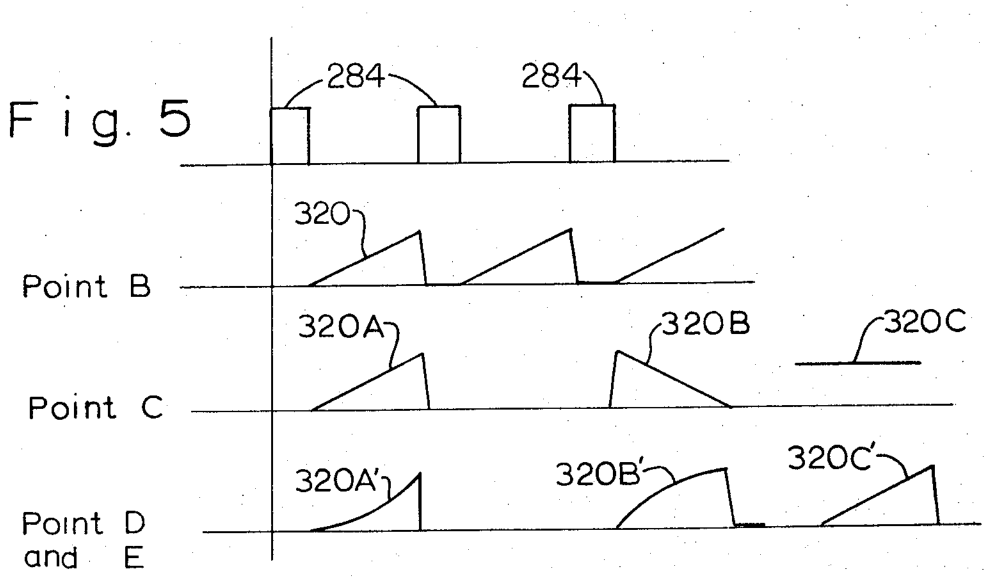
FIG. 5 shows some of the electrical signals which appear in the circuit of FIG. 3.

In operation of the circuit 170 of FIG. 4, periodic pulses 284 are applied to the two reset or clamping transistors 260 and 430 to start a cycle of operation and the resistor 310 and capacitor 300 network provide, at point B, ramp or sawtooth voltage wave 320 (FIG. 5). These waves are applied to the input of op amp 340 and if the potentiometer 410 is in contact with the negative input, then the output wave 320A at point C is substantially the same as the waveform 320. If potentiometer 410 is at the positive input line, inversion takes place and the waveform 320B appears at C. If the potentiometer is at approximately the midpoint, then the waveform 320C appears. These same waveforms are integrated by the resistor 370 and capacitor 420 and appear at point D as corresponding waves 320A', 320B' and 320C', as shown. The waves which appear at point D appear at the output terminal 384 (point E) of the second op amp 380, but adjustment of the two potentiometers 390 and 400 control the amplitude of the waves and their position with respect to a reference level.

The waveforms which appear at the output of the third op amp 460 are the same as those which appear at point B and the potentiometers 480 and 470 are used to adjust the amplitude and position of these waves with respect to a reference level.

Figure 6:
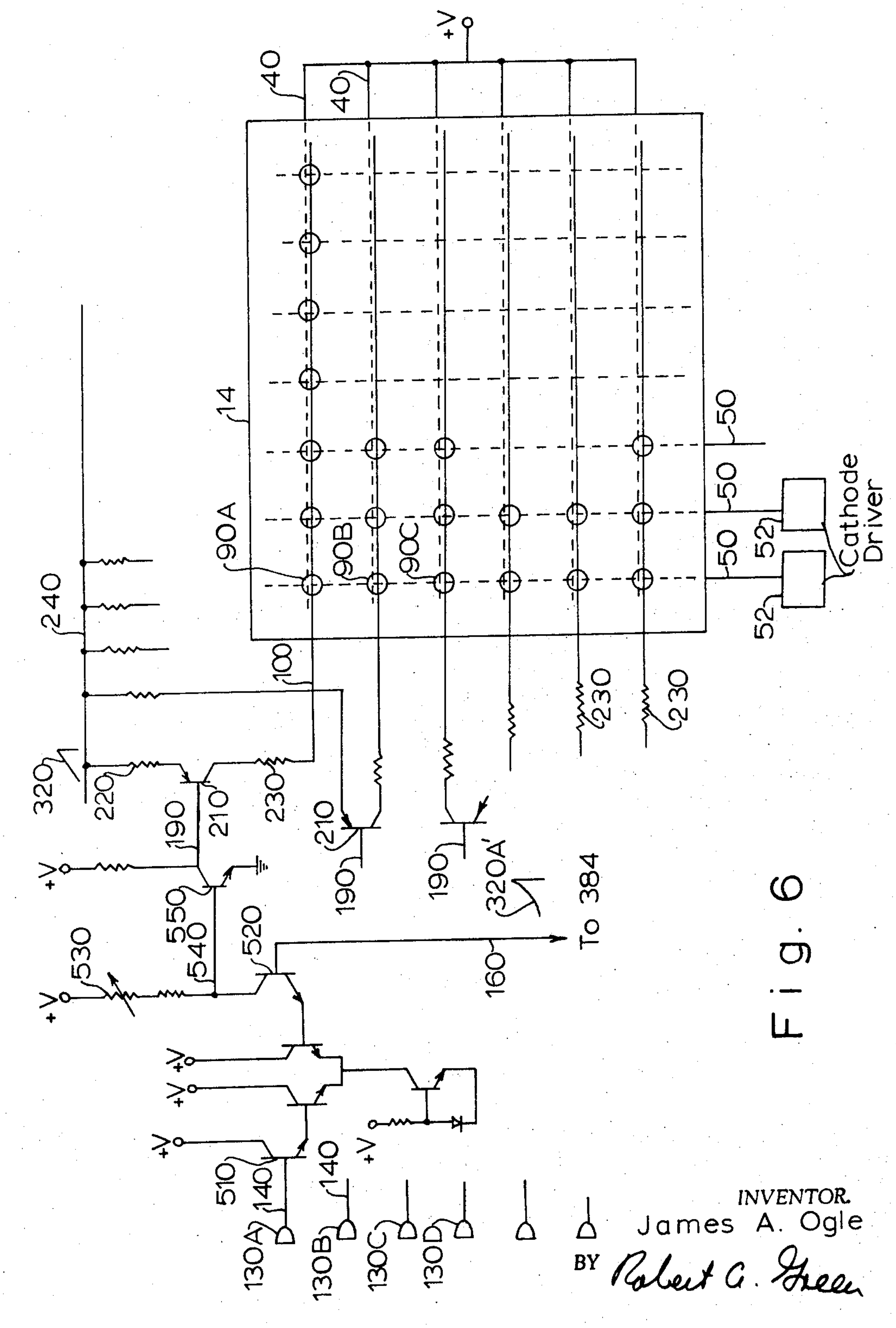
FIG. 6 is a schematic representation of a display panel and a circuit embodying the invention.

The voltage comparator circuit 150 shown in detail in FIG. 6 is a dual Darlington, in one embodiment of the invention, and includes a first input NPN transistor 510 which has its base coupled by lead 140 to a photodiode 130. A second input NPN transistor 520 has its base electrode connected to lead 160 which extends from the output terminal 384 of the second op amp 380. The collector of the second input transistor 520 is connected through a resistive path, including a variable resistor 530, to a source of positive potential and by lead 540 to the base of switching transistor 550. The output or collector of the switching transistor 550 is connected to the base of transistor 210 which, as described above, is connected to operate as a current source and has its collector connected through a resistor 230 to one of the display anodes 100 by lead 560. The emitter of the transistor 210 is connected through resistor 220 to bus 240 which is connected to the output 500 of the third op amp 460 (FIG. 4).

Each display anode 100 has its own signal channel including a photodiode 130 and the other circuit elements described above and shown in FIG. 6.

In operation of the circuit of FIG. 6, at the beginning of a cycle of operation, it is assumed that the scanning anodes 40 carry operating potential and that the first cathode driver 52 applies suitable negative operating potential to the first cathode 50 so that all of the scanning cells in the first column are on. A voltage wave 320 from op amp 460 is applied to bus 240 and to all of the transistors 210, and current flows through all of the transistors 210 to all of the display anodes 100 and all of the display cells in the first column tend to turn on and pass current.

Now considering some of the individual video channels, if the first photodiode 130A transmits a high intensity signal to transistor 510 and simultaneously a voltage wave, e.g. 320A', is applied to transistor 520, both transistors and transistor 210 conduct current until, as wave 320A' increases in amplitude, the potential at the input to transistor 510 equals that applied to the input of transistor 520 at which time transistors 510 and 520 turn off, switching transistor 550 turns on and anode driver transistor 210 turns off. With a high intensity video signal, this cycle of operation takes a relatively long time and a high current flows through the first display cell 90A and the cell glows with high brightness.

If the video signal from photodiode 130B is smaller, then the foregoing cycle and turn-off of transistor 210 occur more quickly and the current through cell 90B reaches a lower maximum limit than cell 90A and its brightness is lower.

If the video signal from photodiode 130C is at a low level, the comparator operates to turn off transistor 210 quickly and at a low point on wave 320 and little current flows through display cell 90C and this cell produces dim light output.

In this way, each of the display cells in the first column produces light output of an intensity determined by the amplitude of the input video signal.

This operation is repeated for each column of cells in panel 14 as the column of photodiodes scans the scene to be reproduced and both the scanning of the scene and the scanning of the panel are repeated cyclically and continually at such a rate that a stationary, but changeable, picture having gray scale is displayed in panel 14.

It is to be noted that in circuit 170 shown in FIG. 4, the amplitude and reference level of the waves 320 can be adjusted by means of the potentiometers 390 and 400 and the amplitude and reference level of the voltage waveform 236 can be adjusted by means of the potentiometers 470 and 480. In addition, the shape of the waveform 320 can be modified over a relatively wide range by adjustment of potentiometer 410 at the input of op amp 340. This permits adjustment of the contrast and brightness as scenes change and as their degrees of contrast change. It also permits adjustment of detail reproduced in dark areas of a scene.

Figure 7:
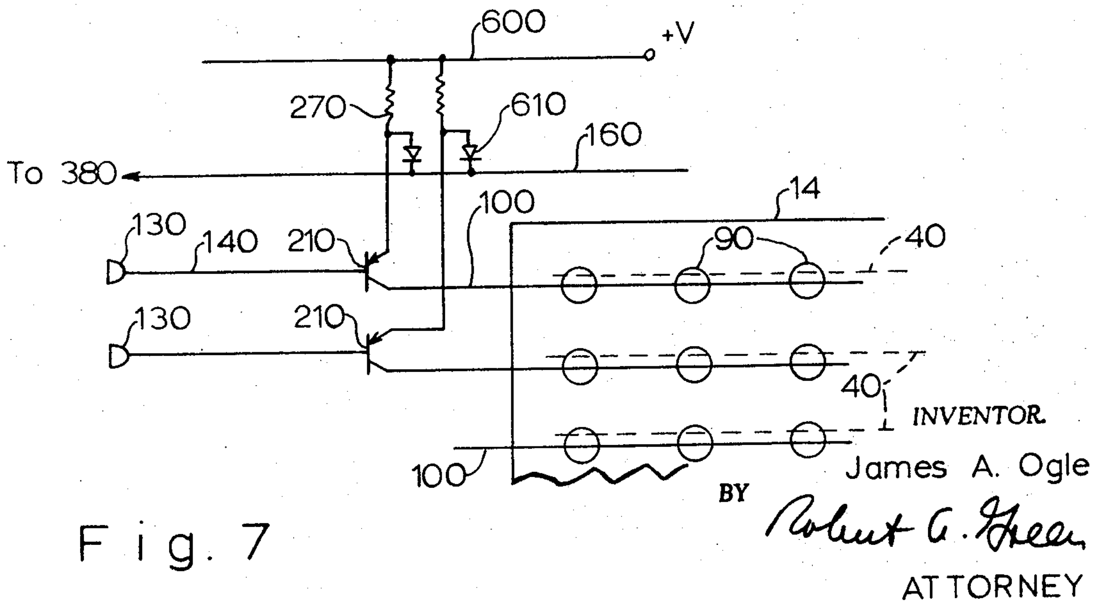
FIG. 7 is a schematic representation of a portion of a display panel and a circuit used in practicing the invention.

In a system modification illustrated in FIG. 7, each display anode is coupled to transistor driver 210 and each such transistor has its emitter connected through a resistive path to a bus 600 which is connected to a positive DC power supply. The emitter is also connected through a diode 610 to bus 160 which is connected to the output of op amp 380 from which the voltage waveforms 320 are derived. The bases of the anode drivers 210 are connected directly to the photodiodes 130 and the collectors, of course, are connected to the display anodes 100, as described above.

In operation of the system of FIG. 7, the transistor 210 represents a constant current source for its display anode 100 with the amplitude of the current being determined by the input to the base from the photodiode 130 and with the time duration of the current being determined by the reference voltage wave 320 applied to bus 160 and to the emitter of the transistor 210. The amplitude and time duration of the current flowing through a display anode determines the brightness of the associated display cell 90. Each display anode 100 is connected to a transistor 210 and the associated circuitry shown in FIG. 7 and as each column of cells is scanned and as the scene is scanned by the photodiodes 130, each cell operates at a brightness determined by the signal from the photodiode 130 and the reference waveform 320 and the desired gray scale picture is reproduced in panel 14.

What is claimed is:

1. A system for operating a display panel comprising a plurality of rows and columns of gas-filled cells, each of which can be turned on and caused to glow by the passage of current between first and second electrodes associated with each cell, said system comprising a current source connected to said panel and adapted to pass current through said cells, a source of video signals connected to said current source, and a source of control signals connected to said current source for modifying the character of said video signals, the relationship between the amplitudes and shapes of said video signals and said control signals determining the amplitude and time duration of current flow through a cell and the brightness at which the cell glows.

2. A system for operating a display panel comprising a plurality of rows and columns of gas-filled cells, each of which can be turned on and caused to glow by the passage of current between first and second electrodes associated with each cell, said system comprising a transistor current source having its collector connected to said panel and adapted to pass current through said cell, a source of video signals coupled to the base of said transistor current source, and a source of control signals connected to the emitter of said current source, the relationship between the amplitudes and shapes of said video signals and said control signals determining the turn-off of said transistor and the amplitude and time duration of current flow through a cell and the brightness at which the cell glows.

3. The system defined in claim 2 wherein said panel includes an anode electrode associated with each row of cells and a cathode electrode associated with each column of cells, and a separate transistor current source is coupled by its collector to each anode electrode.

4. The system defined in claim 3 wherein an optical scanning device generates said video signals and one of said devices is coupled to each of said transistor current sources, said source of control signals being coupled to the emitter electrodes of all of said transistors in common.

5. A system for operating a display panel comprising a plurality of rows and columns of gas-filled cells, each of which can be turned on and caused to glow by the passage of current between first and second electrodes associated with each cell, said system comprising a current source connected to said panel and adapted to pass a current wave through said cell, a switch coupled to said current source, a voltage comparator, a source of video signals and a source of control signals, both coupled to said voltage comparator, said comparator functioning when the voltages of said video signal and said control signal are equal, to operate said switch and thereby to turn off said current source whereby the amplitude and time duration of the current flow through a cell and the cell brightness are limited.

6. The system defined in claim 5 wherein said current wave is of generally sawtooth form.

7. The system defined in claim 5 wherein said panel includes an anode electrode associated with each row of cells and a cathode associated with each column of cells, and a separate current source is coupled to each anode electrode.

8. The system defined in claim 5 wherein said control signals are generally sawtooth voltage waves.

9. The system defined in claim 5 wherein said control signals are generally sawtooth voltage waves and said current wave is of generally sawtooth form.

10. The system defined in claim 5 wherein an optical scanning device generates said video signals and one of said devices is coupled to each of said current sources.

11. A system for operating a display panel comprising a plurality of rows and columns of gas-filled cells, each of which can be turned on and caused to glow by the passage of current between first and second electrodes associated with each cell, said system comprising a transistor current source having its collector connected to said panel and adapted to pass current through said cell, a source of video signals coupled to the base of said transistor current source, and a source of generally sawtooth control signals connected to the emitter of said current source, the relationship between the amplitudes and shapes of said video signals and said control signals determining the turn-off of said transistor and the amplitude and time duration of current flow through a cell and the brightness at which the cell glows.

12. A system for operating a display panel comprising a plurality of rows an columns of gas-filled cells, each of which can be turned on and caused to glow by the passage of current between first and second electrodes associated with each cell, said system comprising a transistor current source connected to said panel and adapted to pass current through each said cell, a source of a first generally sawtooth signal coupled to said transistor and controlling the amplitude of current flow through each said cell, with the glow brightness being proportional to the amplitude of the current flow and the amplitude of current flow being proportional to the portion of said sawtooth signal applied to said transistor, a voltage comparator coupled to said transistor and controlling the application of said sawtooth signal to said transistor, a source of video signals and a source of second generally sawtooth control signals, both coupled to said voltage comparator, said comparator functioning when the voltages of said video signal and said control signal are equal to turn off said transistor, the turn-off time of said transistor occurring at some point on said first sawtooth signal which determines the amplitude and time duration of the current flow through a cell and the cell brightness.

13. A system for operating a display panel comprising a plurality of rows and columns of gas-filled cells, a cathode electrode aligned with each column of cells and an anode electrode aligned with each row of cells, each cell being capable of being turned on and caused to glow by the passage of current between a cathode and an anode electrode associated with each cell, said system comprising a transistor current source connected to each said anode electrode and adapted to pass a current wave through a selected cell when a selected cathode is also energized, a source of generally sawtooth control signals coupled to each said transistor current source for controlling the amplitude of current flow through said cells, with the glow brightness being proportional to the amplitude of the current flow and the amplitude of current flow being proportional to the portion of said sawtooth signal applied to said transistor, a voltage comparator coupled to each transistor current source, a plurality of sources of video signals, each coupled to one of said voltage comparators, and a single source of generally sawtooth control signals coupled to all of said voltage comparators, each voltage comparator providing an output signal to operate its current source when the relationship between its video signal and sawtooth control voltage are such that there is an output from the voltage comparator, each voltage comparator providing no output when the applied video signal and sawtooth control signal are equal in amplitude whereupon the associated transistor current source is turned off and any associated gas cell which has been ON is turned OFF after having reached a level of brightness determined by the length of time its current source had been ON, said length of time being determined by the relationship between the video signal and the sawtooth control signal.

14. The system defined in claim 13 wherein said source of control signals comprises a source of generally rectangular pulses, an integrating circuit for converting said pulses to sawtooth waves, said integrating circuit being connected to a first amplifier for controlling the amplitude and reference level of said sawtooth waves, the output of said first amplifier being coupled to the emitters of all the anode current sources, said integrating circuit also being connected through a second amplifier to a second integrating circuit, and then to a third amplifier, the output of which is coupled to one input of said voltage comparator circuit.

15. The system defined in claim 13 wherein said source of control signals comprises a source of generally rectangular pulses, an integrating circuit for converting said pulses to sawtooth waves, said integrating circuit being connected to a first amplifier for controlling the amplitude and reference level of said sawtooth waves, the output of said first amplifier being coupled to the emitters of all the anode current sources;

said integrating circuit also being connected through a second amplifier to a second integrating circuit, and then to a third amplifier, the output of which is coupled to one input of said voltage comparator circuit, and a potentiometer coupled to the input of said second amplifier and usable to change the shape of the pulses applied to said third amplifier.

16. The system defined in claim 13 wherein each said transistor current source includes base, emitter, and collector electrodes and including a bus connected to the output of said source of control signals, a connection from said bus to the emitter of each of said transistor current sources, the base of each transistor current source being connected to the output of its voltage comparator, one input of said voltage comparator being connected to a source of video signals and the other input of said voltage comparator being connected to an output from said source of control signals.

17. The system defined in claim 13 wherein each said transistor current source includes base, emitter, and collector electrodes and including a bus connected to the output of said source of control signals, a connection from said bus to the emitter of each of said transistor current sources, the base of each transistor current source being connected to the output of its voltage comparator, one input of said voltage comparator being connected to a source of video signals and the other input of said voltage comparator being connected to an output from said source of control signals, said source of control signals comprising a source of generally rectangular pulses, an integrating circuit for converting said pulses to sawtooth waves, said integrating circuit being connected to a first amplifier for setting the D.C. level of said sawtooth waves and from there to said bus connected to the emitters of all of said transistor current sources, said integrating circuit also being connected through a second amplifier to a second integrating circuit to a third amplifier and then to said other input of said voltage comparator circuit.

* * * * *